Figure 1:
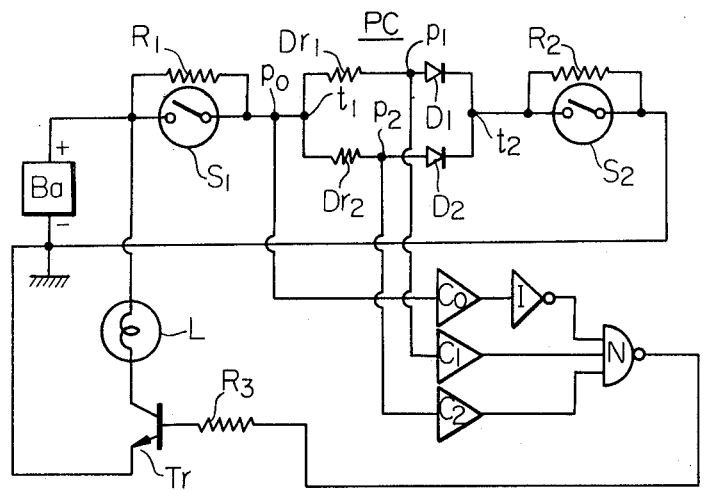

United States Patent [19]
Hosaka

[11] 3,818,431
[45] June 18, 1974

[54] FAULT DETECTOR FOR MOTOR VEHICLE SAFETY DEVICE

[75] Inventor: Akio Hosaka, Yokohama City, Japan

[73] Assignee: Nissan Motor Company, Limited, Yokohama City, Japan

[22] Filed: Feb. 20, 1973

[21] Appl. No.: 333,526

[30] Foreign Application Priority Data
Feb. 23, 1972  Japan............................... 47-21615

[52] U.S. Cl.......... 340/52 H, 340/248 A, 307/10 R
[51] Int. Cl. ............................................ G08b 21/00
[58] Field of Search..... 340/52 R, 52 B, 52 D, 52 F, 340/52 H, 53, 59, 60, 244, 248 R, 248 A, 248 E, 253; 307/10 R, 10 LS

[56] References Cited
UNITED STATES PATENTS
| | | | |
|---|---|---|---|
| 3,427,607 | 2/1969 | Oesterle......................... | 340/248 A |
| 3,711,827 | 1/1973 | Houseman....................... | 340/52 F |
| 3,742,447 | 6/1973 | Sognefest....................... | 340/52 F |

*Primary Examiner*—Alvin H. Waring
*Attorney, Agent, or Firm*—Robert E. Burns; Emmanuel Lobato; Bruce L. Adams

[57] ABSTRACT

Detection of fault or failure in safety device actuator is accomplished by measuring voltages appearing at given points in the actuator circuit in case of failure therein, and by comparing the measured voltages by means of comparators forming a logic circuit so as to produce a logic circuit output signal therefrom to give a warning in response to the logic circuit output signal. The voltages appearing at the points are about nought or alternatively a source voltage. Only one resistor is used for applying bias voltages to the points. The electric power source is grounded at its positive or negative terminal.

6 Claims, 2 Drawing Figures

FAULT DETECTOR FOR MOTOR VEHICLE SAFETY DEVICE

The present invention is generally concerned with a safety device for a motor vehicle and, more particularly, with an improved detector for reliably detecting failure of, or a fault in an actuator of a safety device for a motor vehicle.

It is well known to have a motor vehicle equipped with a safety device for protecting a vehicle occupant from injury in the event of a collision of the motor vehicle. A known safety device generally includes collision sensors or impact-responsive switch means for sensing an impact during the collision and an actuator of the device comprising electrically actuable detonators for firing an explosive charge. There is, however, a fear of such an actuator of the safety device being in a faulty condition due to shocks, vibrations or physical breakage caused by road bumps while running the motor vehicle, resulting in the actuator being inoperative in the event the motor vehicle encounters a collision. For example, the detonators or the switch means could be destroyed or broken down, or electric connectors could be cut or disconnected from them so that a closed electric circuit can not be established. Furthermore, there is a possibility of malfunctionally closing the switch means prior to a collision (this switch means is such as to close in response to the collision of the motor vehicle). Accordingly, it is desired to detect such a fault immediately after is develops in the actuator of the safety device.

For this purpose, there has been provided in the prior art actuator of a safety device a fault detector of the type in which the detection of the faulty condition of the actuator is accomplished by measuring the variation of voltages appearing at some given points in the electric circuit of the actuator in the event a fault develops in the actuator. The prior art actuator as provided with such a fault detector generally comprises an electric power source such as a DC battery, first and second collision sensors or impact-responsive switch means connected to the DC battery, each switch means being shunted by a resistor, a parallel circuit connected between the first and second switch means and formed by a plurality of detonators connected in parallel with each other, each detonator being connected in series with a diode, a logic circuit including comparators connected to some given points in the electric circuit of the actuator, and a warning means such as an indicator lamp which is connected to an output of the logic circuit and which is arranged on an instrument panel of the motor vehicle. In this fault detector, detection of the fault in the actuator is accomplished by measuring a voltage appearing at a point between the first switch means and the parallel circuit and voltages appearing at other points corresponding to the junctions between the detonators and the diodes, by comparing the measured voltages by means of comparators forming the logic circuit, and lighting the lamp in response to an output signal of the logic circuit, whereby the vehicle driver can notice the faulty condition of the actuator of the safety device at a glance when the lamp begins glowing immediately after the fault develops in the actuator, suggesting that the actuator be fixed immediately prior to a possible collision of the motor vehicle.

With the arrangement of the actuator of the prior art, it should be noted that two resistors for applying bias voltages to the points are necessary (See FIG. 1). Each resistor shunts the corresponding switch means, as mentioned above. Furthermore, it should be noted that any one of the detonators forming the parallel circuit is connected to one common terminal of the parallel circuit which corresponds to the junction between the first switch means and the parallel circuit, while any one of the diodes is connected to the other common terminal of the parallel circuit which corresponds to the junction between the second switch means and the parallel circuit. As previously mentioned, the detection of the faulty condition of the actuator is accomplished by measuring the variation of the voltages appearing at the points in the event a fault develops therein. Accordingly, it is understood that the greater the variation of the voltages, the more accurately the fault in the actuator is detected. However, with the above-mentioned arrangement of the prior art actuator, there is little variation of the voltages appearing at the points in the event of a fault developing. Actually, the maximum variation of the voltages is substantially equal to only half the source voltage of the DC battery at the most. If the DC battery having a source voltage of $Vb$ is employed, the maximum variation of the voltages is substantially equal to one-half $Vb$. In other words, the difference between the highest and lowest voltages appearing at the points is limited to the range of one-half $Vb$. Thus, the comparators of the logic circuit have to compare the voltages measured at the points under this condition. This means that the comparators employed should be such that they can compare the voltages even in such a narrow range of variation of the voltages in the event a fault develops in the actuator, resulting in the logic circuit becoming complicate in construction and in operation. Moreover, in an actuator of this kind a voltage drop is caused by the provision of the diodes in the event the second switch means closes. The voltage drop has an undesired influence on the voltages appearing at the points, that is, the maximum variation of the voltages becomes less than half the source voltage of the DC battery; the difference between the highest and lowest voltages appearing at the points becomes smaller than ever. Additionally, in an actuator of this kind, even though it is easy to detect a fault if either only one detector or a plurality of detonators connected in series with each other are employed, it is difficult to detect a fault if a plurality of detonators are connected in parallel with each other, because of the relatively low source voltage of the Dc battery which is never a high voltage power source. In this connection, each detonator employed has a relatively low resistance, usually 1 ohm or less than 10 ohms, so that if one of the detonators should be disconnected or break down, then there is so little variation of the total resistance of the detonators as to make it difficult to perceive the variation of the voltage supplied to the detonators from the DC battery. As a result, it will become difficult to detect a faulty condition of the actuator of the safety device by the variation of the voltages appearing at the points.

Thus, there is a continuing need for an improved fault detector for an actuator of a safety device for a motor vehicle.

Accordingly, it is an object of the present invention to provide an improved fault or failure detector for an actuator of a safety device for a motor vehicle overcoming the above problem of the prior art.

Another object of the present invention is to provide an improved fault or failure detector which is capable of detecting a fault in the actuator of the safety device immediately after a fault develops therein.

Still another object of the present invention is to provide an improved fault or failure detector which is simple in construction and reliable in operation.

Still a further object of the present invention is to provide an improved fault or failure detector which can be partially assembled by use of integrated circuit elements.

Briefly stated, in accordance with the present invention an improved fault or failure detector of an actuator of a safety device is provided in which there occurs a relatively great variation between voltages appearing at some given points in an electric circuit of the actuator in the event a fault develops therein; the maximum variation of the voltages is substantially equal to a source voltage of an electric power source employed. Moreover, it should be noted that the voltages appearing at the points are actually substantially equal to either nought or alternatively the source voltage, so that it is easy to compare the voltages through comparators in a logic circuit. This results in simple construction of the comparators and reliability in operation, and enables the comparators to be manufactured with integrated circuits. Furthermore, the voltages appearing at the points are not influenced by voltage drops caused by diodes included in the actuator. Furthermore, there is only one resistor for applying bias voltage to the points so that the overall arrangement of the actuator can be simplified, resulting in the actuator being low in cost.

Figure 2:
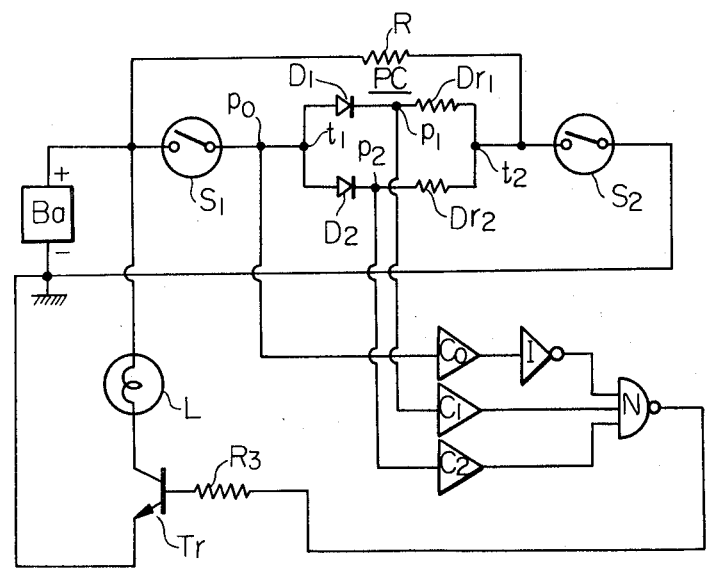

The present invention is only limited by the appended claims. A better understanding of the above and further objects and advantages of the present invention may be obtained by referring to the drawing in which like reference numerals and characters designate similar parts throughout various figures and in which:

FIG. 1 is a schematic circuit diagram illustrating an overall arrangement of an actuator of a safety device provided with a prior art fault detector therefor; and FIG. 2 is a schamatic circuit diagram illustrating an overall arrangement of an actuator of a safety device provided with a fault detector therefor in accordance with the present invention.

Referring more particularly to FIG. 1, there is shown an electric circuit of an actuator of a safety device provided with a prior art fault detector. In the electric circuit of the actuator, a power source is represented by a DC battery $Ba$ having a source voltage $Vb$ which is grounded at its negative terminal. Connected in series with the DC battery $Ba$ are first and second collision sensors or impact-responsive switch means $S_1$ and $S_2$ for sensing an impact resulting from a collision of the motor vehicle, either of which is such as to close in response to a collision condition of the motor vehicle. The switch means $S_1$ and $S_2$ are usually mounted on a collapsable protruding portion of the motor vehicle such as a bumper. The switch means $S_1$ and $S_2$ are shunted by resistors $R_1$ and $R_2$ having values of resistance, $r_1$ and $r_2$, respectively. In this instance, the value of resistance $r_1$ is substantially equal to $r_2$. Between the switch means $S_1$ and $S_2$ two electrically actuable detonators $Dr_1$ and $Dr_2$ are connected in series for firing an explosive charge, e.g., to release pressurized gas from a gas reservoir during a collision. The detonators $Dr_1$ and $Dr_2$ are connected in series with diodes $D_1$ and $D_2$ respectively, which allow current to flow therethrough in only one direction from the positive to negative terminals of the DC battery $Ba$, i.e., in the forward direction. As shown, the detonators and diodes form a parallel circuit PC. The detonators $Dr_1$ and $Dr_2$ have values of resistance, $dr_1$ and $dr_2$, respectively which are considerably lower than those of the resistors $R_1$ or $R_2$; that is, there is a relationship between them in that $r_1 = r_2 >> dr_1$ or $dr_2$. The value of resistance, $dr_1$ or $dr_2$, is generally less than 10 ohms, but usually approximately 1 ohm. With this arrangement, it should be noted that the parallel circuit PC has one common terminal $t_1$ connected to one terminal of the first switch means $S_1$ and the other common terminal $t_2$ connected to one terminal of the second switch means $S_2$. Three comparators designated by $C_0$, $C_1$ and $C_2$ are connected to points $P_0$, $P_1$ and $P_2$ in the circuit. The comparators serve to compare the voltages appearing at the points $P_0$, $P_1$ and $P_2$ so as to produce the respective logic output signals. The output of the comparator $C_0$ is applied to an inverter I for inverting the logic output signal of the comparator $C_0$. A logic output signal of the inverter I is applied to one input of a NAND gate N and, on the other hand, logic output signals of the comparators $C_1$ and $C_2$ are directly applied to the other inputs of the NAND gate N, so that the NAND gate N will produce a logic output signal. The logic output signal of the NAND gate N is applied through a resistor $R_3$ to the base of a transistor $Tr$ the emitter of which is connected to the negative terminal of the DC battery $Ba$. The collector of the transistor $Tr$ is connected to a warning means which, in this illustration, is in form of a lamp L. The lamp L is also connected to the positive terminal of the DC battery $Ba$.

Thus, with this circuitry arrangement of the prior art fault detector, when the actuator stays normal, any of the voltages appearing at the points $P_0$, $P_1$ and $P_2$ is substantially equal to half the source voltage, i.e., one-half $Vb$, since there is a relationship between the resistors $R_1$ and $R_2$ and the detonators $Dr_1$ and $Dr_2$ in that $r_1 = r_2 >> dr_1$ or $dr_2$, as previously mentioned. The voltages of one-half $Vb$ at the points $P_0$, $P_1$ and $P_2$ are applied to the corresponding comparators $C_0$, $C_1$ and $C_2$. The comparator $C_0$ then produces a logic "0" output signal and both comparators $C_1$ and $C_2$ produce logic "1" output signals. The logic "0" output signal of the comparator $C_0$ is inverted by the inverter I so that a logic "1" output signal is applied from the inverter I to one input of the NAND gate N. The logic "1" output signals of the comparators $C_1$ and $C_2$ are directly applied to the other inputs of the NAND gate N. As is appreciated by those skilled in the art of logic circuit design, with the logic "1" signals applied to the inputs of the NAND gate N, there appears at its output a ligic "0" signal which is applied through the resistor $R_3$ to the base of the transistor $Tr$ so that the transistor $Tr$ is rendered nonconductive. As the result, the lamp L stays off so that the vehicle driver can verify the normal condition of the actuator of the safety device. On the other hand, in the event a fault develops in the actuator, at least one of the voltages appearing at the points $P_0$, $P_1$ and $P_2$ will become higher or lower than half the source voltage of the DC battery $Ba$. Thus, the NAND gate N will, in turn, produce a logic "1" output signal which is applied to the base of the transistor T$r$ so that the transistor T$r$ will be rendered conductive, resulting in the lamp L being lighted. As the result, the vehicle driver can easily notice a faulty condition of the actuator of the safety device.

In this fault detector, however, two resistors $R_1$ and $R_2$ for applying bias voltages to the points are necessary to detect a faulty condition in the event the first switch means $S_1$ closes malfunctionally prior to a collision of the motor vehicle. This results in that the actuator becomes complicate in construction and high in cost. Furthermore, it should be noted that voltage drop is caused by the provision of the diodes $D_1$ and $D_2$ in the event the second switch means $S_2$ closes malfunctionally, with the result that it has an undesirable influence upon the voltages appearing at the points. In this connection, if Vd is the voltage drop caused by the diodes $D_1$ and $D_2$, usually 0.6 volts; $Vc_0$, the reference voltage level of the comparator $C_0$; $Vc_1$, the reference voltage level of the comparator $C_1$; and $Vc_2$, the reference voltage level of the comparator $C_2$, then the relationship between them should be as follows: $½ Vb < Vc_0$, $Vd < Vc_1 < ½ Vd$ and $Vd < Vc_2 < ½ Vb$. This means that the comparators employed will become complicate in construction and unreliable in operation. Thus, the prior art fault detector for a safety device is inadaquate and a series problem remains to be solved. In order to overcome the above problem, an improved fault detector for a safety device of a motor vehicle is provided in accordance with the present invention.

Reference is now made to FIG. 2 in which a preferred embodiment of a fault detector for a safety device in accordance with the present invention is illustrated. The elements used in this embodiment function similarly to the corresponding elements forming the prior art fault detector as described above with reference to FIG. 1. In this embodiment, a DC battery B$a$ is shown as grounded at its negative terminal. Connected in series to the DC battery B$a$ are first and second collision sensors or impact-responsive switch means $S_1$ and $S_2$. Between the switch means $S_1$ and $S_2$ two electrically actuable detonators $Dr_1$ and $Dr_2$ are connected in parallel with each other. The detonators $Dr_1$ and $Dr_2$ are connected in series to diodes $D_1$ and $D_2$ respectively. As shown, the detonators and diodes form a parallel circuit PC. A series connection composed of the switch means $S_1$ and the parallel circuit PC is shunted by a resistor R; that is, the resistor R is connected at one terminal to the positive terminal of the DC battery B$a$ and at the other terminal to a common terminal $t_2$ of the parallel circuit PC. The resistor R has a value of resistance $r$ which is considerably higher than that of the detonator $Dr_1$ or $Dr_2$. There is a relationship between them in that $r >> dr_1 = dr_2$. With this arrangement, it should be noted that the diodes $D_1$ and $D_2$ are connected to one common terminal $t_1$ of the parallel circuit PC, while the detonators $Dr_1$ and $Dr_2$ are connected to the other common terminal $t_2$ of the parallel circuit PC. Furthermore, it should be noted that only one resistor R is used in this actuator. The points $P_0$, $P_1$ and $P_2$ are connected to three comparators $C_0$, $C_1$ and $C_2$ respectively. The comparator $C_0$ is connected through an inverter I to one input of a NAND gate N and the comparators $C_1$ and $C_2$ are directly connected to the other inputs of the NAND gate N. An output of the NAND gate N is connected through a resistor $R_3$ to the base of a transistor T$r$ the emitter of which is connected to the negative terminal of the DC battery B$a$. The collector of the transistor T$r$ is connected to a warning means, in this case, a lamp L which is also connected to the positive terminal of the DC battery B$a$.

When, in operation, the actuator stays normal with the switch means $S_1$ and $S_2$ open, a voltage appearing at the point $P_0$ is substantially equal to nought and voltages appearing at the points $P_1$ and $P_2$ are substantially equal to the source voltage V$b$, since there is a relationship between the resistor R and the detonators $Dr_1$ and $Dr_2$ in that $r >> dr_1 = dr_2$, as mentioned above. The respective voltages at the points $P_0$, $P_1$ and $P_2$ are then applied to the corresponding comparators $C_0$, $C_1$ and $C_2$. Any of the comparators is such as to produce a logic "0" output signal if its input signal is at zero voltage level and to produce a logic "1" output signal if its input signal is at a positive voltage level. Therefore, the comparator $C_0$ then produces a logic "0" output signal and both comparators $C_1$ and $C_2$ produce a logic "1" output signal. The logic "0" output signal of the comparator $C_0$ is inverted by the inverter I so that a logic "1" output signal is applied from the inverter I to one input of the NAND gate N. On the other hand, the logic "1" output signals of the comparators $C_1$ and $C_2$ are directly applied to the other inputs of the NAND gate N. The NAND gate N then produces a logic "0" signal which is applied through the resistor $R_3$ to the base of the transistor T$r$, rendering the transistor T$r$ nonconductive. As the result, the lamp L stays shut off so that the vehicle driver can easily verify the normal condition of the actuator of the safety device.

The operation of the fault detector in the event a fault develops in the actuator will be discussed below. First, if the switch means $S_1$ closes malfunctionally although the vehicle does not encounter a collision, the voltage appearing at the point $P_0$ will change its level from zero to the source voltage level i.e., V$b$. Second, if the switch means $S_2$ likewise closes, the voltages at the points $P_1$ and $P_2$ will change their levels from V$b$ to zero. Thirdly, if the detonator $Dr_1$ is broken down or disconnected from the diodes or the switch means, the voltage appearing at the point $P_1$ will change its level from V$b$ to zero. The same will apply to the detonator $Dr_2$. Finally, if all of the faults or failures mentioned above occur simultaneously in the actuator, all of the voltages at the points $P_0$, $P_1$ and $P_2$ will become zero. In any cases mentioned above, it will be appreciated by those skilled in the art that the NAND gate N then produces a logic "1" output signal which is applied through the resistor $R_3$ to the base of the transistor T$r$, rendering the transistor T$r$ conductive so that the lamp L is lighted. As a result, the vehicle driver can easily notice the faulty condition of the actuator of the safety device at a glance seeing the lamp L glowing immediately after a fault develops in the actuator.

Many modifications may be made to the circuitry arrangement in the embodiment of the present invention as shown in FIG. 2. For instance, the DC battery B$a$ can be grounded at its positive terminal and thereby having the diodes $D_1$ and $D_2$ connected in reverse direction, provided that the comparators then employed are such as to produce logic "0" output signals if the input signals are at zero level and to produce logic "1" output signals if the input signals are negative. Such a modified fault detector operates and functions essentially similarly to the previously described embodiment with reference to FIG. 2. Furthermore, it should be appreciated that it is possible to increase the number of detonators and diodes; that is, a plurality of series circuits formed by a detonator and a diode may be connected in parallel with each other. In this instance, it is understood that the number of the comparators will also increase in accordance with the number of the series circuits. Furthermore, it is possible to employ such series circuits as composed of a plurality of detonators which are connected in series with each other.

In view of the many modified forms which are applicable to the specific embodiment shown in FIG. 2, it is the object of the appended claims to cover all such variations which come within the true scope of the present invention.

What is claimed is:

1. A fault detector for an actuator of a safety device for a motor vehicle comprising:
   a DC electric power source;
   an impact-responsive switch means having one terminal connected to one terminal of said power source;
   at least one series circuit formed by a diode having one terminal connected to the other terminal of said impact-responsive switch means and an electrically actuable detonator having one terminal connected to the other terminal of said diode, said diode allowing current to flow therethrough in only one direction from the positive to negative terminals of said power source the other detonator terminal being connected to another terminal of said power source;
   a resistor bypassing a series connection composed of said impact-responsive switch means and said series circuit;
   a logic circuit responsive to a signal corresponding to a voltage appearing at a junction between said impact-responsive switch means and said series circuit and to a signal corresponding to a voltage appearing at a junction between said diode and said detonator for producing a logic output signal when the voltage signals are indicative of a fault in said actuator; and
   means responsive to said logic output signal of said logic circuit for indicating when a fault develops in said actuator of the safety device.

2. A fault detector as claimed in claim 1, further comprising an additional impact-responsive switch means having one terminal connected to the other terminal of said detonator and the other terminal connected to the other terminal of said power source.

3. A fault detector as claimed in claim 1, in which said logic circuit comprises at least two comparators, at least one inverter, one of said comparators having an input connected to the junction between said impact-responsive switch means and said series circuit and an output connected to said at least one inverter, the other comparator having an input connected to the junction between said diode and said detonator, and a NAND gate having one input connected to an output of said inverter and another input connected to an output of said other comparator.

4. A fault detector as claimed in claim 1, in which said means comprises a transistor having a base connected through a resistor to said logic circuit to receive said logic output signal rendering said transistor conductive and an alarm circuit being closed through an emitter and a collector of said transistor.

5. A fault detector as claimed in claim 1, in which said power source is grounded at its negative terminal.

6. A fault detector as claimed in claim 1, in which said power source is grounded at its positive terminal.

* * * * *